June 11, 1935. C. A. MICHELS 2,004,379
PEA HUSKER
Filed March 19, 1934 2 Sheets-Sheet 2
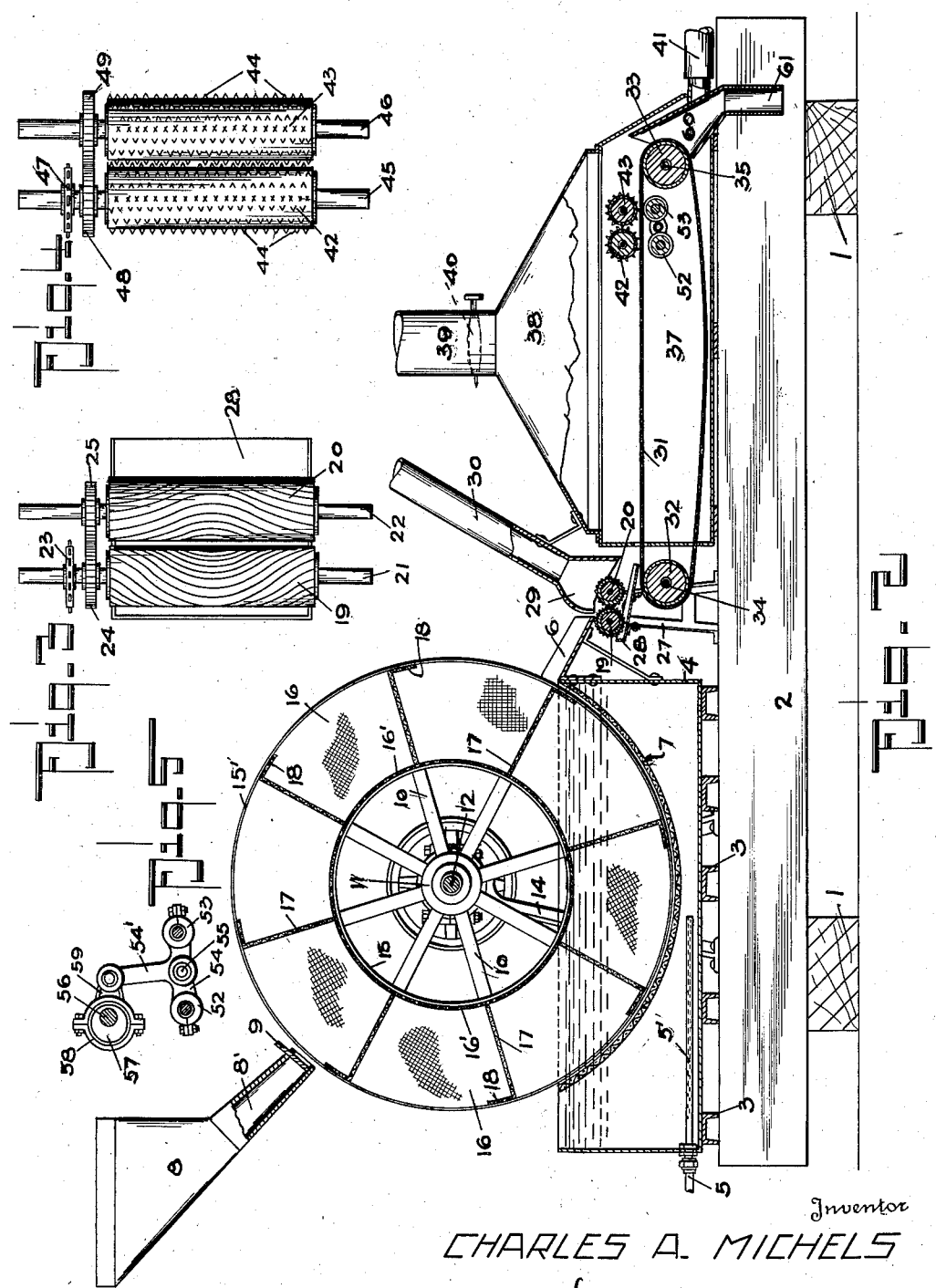
Inventor
CHARLES A. MICHELS
By [signature]
Attorney Patented June 11, 1935

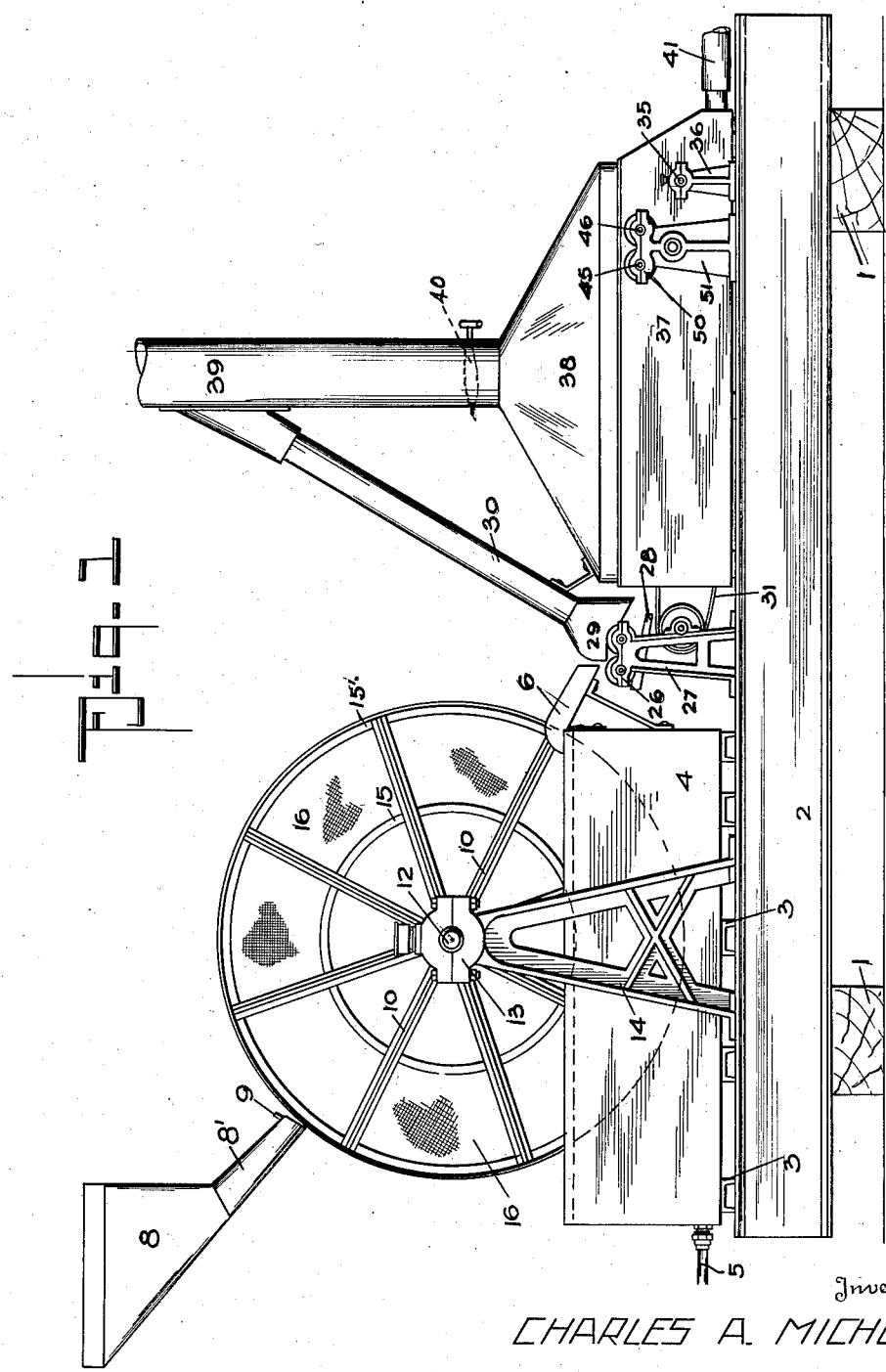

2,004,379

UNITED STATES PATENT OFFICE 2,004,379

PEA HUSKER

Charles A. Michels, Moscow, Idaho, assignor of one-half to Willis L. Crites, Moscow, Idaho Application March 19, 1934, Serial No. 716,297

7 Claims. (Cl. 146—32)

My present invention relates to improvements in pea huskers by means of which the peas are removed from their husks or protective seed coverings and then the peas are split or cracked into halves in preparation for the market. The peas in their husks are fed to the machine after they have been threshed or separated from the pods and the vines and means are provided whereby the peas are heated almost or quite to the bursting point and conveyed to a pair of splitting or husking rollers, which rollers complete the release of the seed halves from their husks. The husks, chaff and other undesirable materials are then separated from the peas and the latter are thoroughly dried of extraneous moisture and thus split or cracked into halves by suitable mechanism and finally discharged into an appropriate receptacle.

In thus carrying out my invention I employ means whereby the peas are washed of soil that may cling thereto and, at the same time, bathed in a chemical solution and then the peas are separated from the husks without marring or bruising and finally split or cracked into halves with a minimum of breakage or crushing.

The invention consists in certain novel combinations and arrangements of parts for accomplishing the above results, as will hereinafter be more fully set forth and claimed. In the accompanying drawings I have illustrated one complete example of the physical embodiment of my invention wherein the parts are combined and arranged according to one mode I have thus far devised for the practical application of the principles of my invention. It will be understood that various changes and alterations may be made in the exemplifying structure, within the scope of my appended claims without departing from the principles of my invention.

Figure 1 is a view in side elevation of a husking machine exemplifying the physical embodiment of my invention, the driving mechanism and power transmission mechanism being omitted for convenience of illustration.

Figure 2 is a vertical longitudinal section of the machine of Figure 1.

Figure 3 is a top plan view of the pair of husking rollers, detached from the machine; and Figure 4 is a top plan view of the pair of rollers forming part of the cracking or splitting means for the peas.

Figure 5 is a detail view of the pair of oscillating rollers and operating means, which rollers cooperate with the rollers of Figure 4 in cracking or splitting the peas.

In the preferred form of my invention as illustrated in the drawings I employ a power-operated machine with a prime mover of suitable type and power transmission mechanism to the moving parts, and the machine may be supported on cross sills 1 and beams 2, upon which foundation a frame 3 is provided for the support of the vat or water tank 4. The tank is of suitable size and shape and provided with means for supplying water to a level near its open top. The water may have been previously heated, or the contents of the tank may be heated by steam from the steam pipe 5 and the steam coil 5', the latter located at the bottom of the tank. Steam is thus introduced into the water to raise the temperature of the water to substantially 212 degrees, at or near the boiling point.

At the upper rear edge of the tank a discharge trough 6 is mounted, through which trough the peas are passed after they have passed through the steaming hot water of the vat or tank.

In the tank is located a concave breast, or arcuate partition 7 of reticulated or foraminous material which permits free flow or circulation of the water in the tank, and the screen or reticulated portion forms a guide-way for the peas as they are immersed in the steaming hot water and as they pass through the tank toward its discharge trough 6.

The peas are fed to the elevated feed hopper 8, which has an outlet chute 8', and the latter is provided with an adjustable outlet gate 9 by means of which the feed of the peas to a rotary carrier is controlled.

The rotary carrier, in the shape of a cylinder, revolves on its horizontal axis, with the lower portion of the carrier immersed in or submerged in the water of the tank, and this carrier is fashioned of reticulated or foraminous material to provide open walls that permit ready access of the hot water to the peas that are contained in the carrier.

The rotary carrier is preferably constructed or built upon spaced spider frames 10 that are secured to the central hub 11, and a horizontal shaft 12 is mounted in the central hub or boss 11 of the spiders. The carrier shaft is journaled in bearings 13 above the tank, and the bearings are mounted in side frames 14 that are fixed at opposite sides of the tank on the beams 2. The carrier shaft is revolved at comparatively low speed by power supplied from a suitable source, and transmission mechanism is provided from this shaft to other operating parts of the machine, as desired.

The two spider-frames are provided with inner side rings 15 and outer side rings 15' and annular side walls 16 or screens are attached to these rings and frames, and between the spaced inner rings 15, 15, an annular reticulated wall or screen 16', thus providing an annular carrying space having reticulated side walls and an annular wall 16'. This space is divided into pockets or baskets by means of radially extending partitions 17 which are positioned transversely between the side walls 16 and extend outwardly from the annular wall 16' to the two outer side rings 15'. These pockets or baskets, in which the peas are discharged from the chute 8', are open at their outer sides, except for a ledge or guard 18 of reticulated material that extends transversely of the carrier.

From this description it will be apparent that the peas are fed successively into the baskets of the carrier, as the latter revolve anti-clockwise in Figure 2, and the contents of the baskets are carried down into the water of the tank, the guard or ledge 18 preventing the peas from falling out of the baskets as their open outer sides turn down into the water of the tank. As the basket enters the water, the peas are permitted to fall by gravity toward the open side of the basket and onto the elevated concave screen or false bottom 7 in the tank, where the peas are tumbled along the screen-bottom of the following partition 17 as the carrier slowly revolves. By the time the peas reach the outlet trough 6 they have been subjected to heat from the hot water sufficient to expand the air in the peas to approximately the bursting point of the husk, and as the peas are discharged over the trough 6 they are in condition which permits easy opening of the husks to free the enclosed pea-halves from their husks. In Figure 2 it will be seen that one of the baskets of the carrier is in position to discharge its contents to flow freely down the partition 17 to the trough 6, and another empty basket is in position to receive a fresh charge of peas from the hopper 8.

The peas as they are discharged from the carrier roll down the trough to the top of a pair of husking rollers 19 and 20 that extend transversely of the carrier and are located just below the trough. The rollers are preferably fashioned of soft rubber, and their surfaces are corrugated in order that as the rollers revolve in opposite directions, with their upper surfaces moving toward the space between them, the rollers may grip the peas with sufficient pressure as to burst open the husks. The freed pea-halves fall between the two rollers, but the husks, chaff, and other extraneous material are disposed of as will be described.

The rollers 19 and 20 are mounted on shafts 21 and 22, one of which shafts has a driving sprocket 23, and the shafts are provided with meshing gears 24 and 25 in order that the rollers may turn uniformly and with their upper surfaces travelling toward the slight space between the rollers. The shafts are journaled in bearings 26 which are mounted in the two spaced frames 27, and an inclined, reticulated tray or screen 28 is disposed beneath the rollers in position to catch the peas as they fall between the two husking rollers 19 and 20.

For the disposal of the opened husks, chaff, and other undesirable material, I provide a suction device that includes a hood 29 located above the husking rollers in position to lift, by suction, these undesirable materials, and a suction pipe 30 which extends from the hood, upwardly, conveys this material into a stack 39, from whence the material is properly disposed of.

As the pea-halves are separated from their husks, or seed-coverings, the halves pass down the reticulated transfer chute 28 and fall upon an endless screen-belt or endless conveyor 31, with its upper flight moving away from the transfer chute. The endless screen-belt or conveyor is supported upon a pair of spaced rolls 32 and 33 which are mounted on shafts 34 and 35 located in planes parallel with the carrier shaft and the husking rollers, and these roll-shafts are journaled in bearings mounted on the frame 27 and another frame 36.

The endless screen-conveyor 31 is enclosed within a housing 37, above which is located a large hood 38, and the stack 39 which rises from this hood is provided with a damper 40 to control the upward draft of air from the hood and through the stack.

As the peas are delivered from the rotary carrier to the husking rollers it will be apparent that considerable moisture will cling to the exterior of the peas, and I therefore provide means, in addition to the suction hood 29 and pipe 30, for evaporating the moisture for the purpose of insuring that the peas will be in their natural or normal state and ready for the market when delivered from the machine. For the evaporation of the moisture I introduce a blast of hot air through the nozzle 41 to the interior of the housing 37, and as the halves are conveyed on the upper working flight of the screen conveyor 31, the moisture that may cling to the peas is evaporated and the vapor passes up through the hood 38 and stack 39, thus freeing the peas of any excess moisture.

The peas are thus freed of excess moisture as they pass from the husking rollers through the housing 37, and near the distal end of the screen-conveyor or endless screen belt 31 additional means are provided for splitting or cracking the peas while they are in transit on the screen-conveyer. For this purpose I employ a pair of splitting rollers 42 and 43, located above the screen conveyor 31, and provided with a multiplicity of teats as 44, the rollers, or the teats or studs 44 being fashioned of soft elastic material, such as rubber. The rollers are enclosed within the housing and extend transversely of the screen conveyor, and the shafts 45 and 46 of the rollers, at their ends, project through the side walls of the housing. Exterior of the housing, one of the shafts as 45 is provided with a driving sprocket wheel 47 over which a suitable drive chain passes for revolving the shaft in one direction, and the shaft 46 is revolved in the opposite direction by means of a pair of gears 48 and 49 on the adjoining shafts. The shafts are journaled in bearings 50, exterior of the housing, mounted in the frames 51, and the splitting rollers are mounted above the screen conveyor with the flexible studs 44 of the rollers out of contact with the top surface of the flexible, screen conveyor upon which the peas are carried.

For co-action with the upper pair of splitting rollers I provide a pair of tapping-rollers 52 and 53, located below the screen conveyor under the respective upper rollers 42 and 43, and extending transversely of the screen belt or conveyor. These tapping-rollers are designed to alternately tap the underside of the screen conveyor and by impact, squeeze or instantaneously grip the passing peas between the upper face of the screen conveyer and the studs 44 of the splitting rollers 42 and 43, thereby splitting or cracking the peas into halves.

These tapping rollers 52 and 53 are mounted in bearings in an oscillatable frame 54, and the latter is mounted to oscillate or rock on the pivot shaft 55 extending transversely through the housing and supported at its ends in bracket frames 51 exterior of the housing. In Figure 5 it will be seen that the oscillating frame 54 of the tapping rollers is provided with a rocker arm 54' and this arm is rocked to oscillate the frame and the rollers 52, 53 from an eccentric shaft 56 that is revolved by suitable transmission mechanism from the driving means for the machine. The shaft 56 is provided with an eccentric disk 57 that turns in the eccentric strap 58, and an arm 59 of the strap is pivoted to the rocker arm 54'. Thus it will be apparent that the frame 54 is oscillated to swing the tapping rollers, alternately, up against the underside of the conveyer screen on which are carried the peas, and the peas, as they pass between the pairs of rollers, are split or cracked into halves as described.

At one end of the screen conveyer, I provide a discharge hood 60 which is located in the housing in position to receive the split peas as they are delivered from the end of the screen-conveyer, and a spout 61 is connected with this delivery or discharge-hood to convey the split peas to a waiting receptacle.

The machine as thus described and illustrated is capable of preparing the peas for the market in a sanitary condition, without marring or bruising, and the continuous operation of the machine in the performance of its functions economizes in time and labor in the required treatment of the peas, and materially reduces the cost of such treatment compared with instrumentalities for similar purposes now on the market.

Having thus fully described my invention, what I claim as new and desire to secure by Letters Patent is:—

1. The combination with a housing and an endless reticulated conveyer therein of a pair of husking rollers at one end of the conveyer, a pair of splitting rollers located above and adjacent the other end of said conveyer, a pair of oscillatable tapping-rollers located beneath the working flight of the conveyer, and means for oscillating said rollers for alternate impact with said working flight against said splitting rollers.

2. In a machine as described, the combination with an endless flexible conveyer for peas, of a pair of splitting rollers mounted above the working flight of the conveyer, an oscillatable frame below the working flight of the roller, a pair of tapping-rollers mounted in said frame and adapted for impact against said conveyer, and means for rocking the oscillatable frame.

3. In a machine as described, the combination with an endless flexible conveyer, of a pair of splitting rollers mounted above the working flight of the conveyer and a multiplicity of elastic studs on the peripheries of said rollers, a pair of tapping rollers beneath said working flight, oscillatable means for supporting the tapping rollers and means for actuating the oscillatable means for alternate impact of the tapping rollers with said flight beneath the splitting rollers.

4. In a machine as described, the combination with means whereby peas are expanded by the presence of hot water, means for husking the peas, an endless conveyer, and a housing for said conveyer, of means for evaporating moisture within the housing, and means for splitting the peas in transit through said housing.

5. In a machine as described, the combination with means whereby peas are expanded in the presence of hot water, of a housing, a conveyer moving in said housing, means for feeding the moistened peas to said conveyer, means co-acting with the conveyer for splitting the peas, and means for introducing an air blast into the housing for the purpose of evaporating excess moisture from the peas.

6. In a machine as described, the combination with means whereby peas are expanded in the presence of hot water, of a housing, an endless, reticulated conveyer moving in said housing, means for feeding the moistened peas to said conveyer, means co-acting with the carrying-flight of the conveyer for splitting the peas, and means for introducing a hot air blast into the housing for the purpose of evaporating excess moisture from the peas.

7. In a machine as described, the combination with a housing, of an endless, reticulated conveyer moving in said housing, means for feeding peas to the carrying-flight of the conveyer, means co-acting with the carrying-flight for splitting the peas thereon, and means for circulating air in the housing for the purpose of evaporating excess moisture from the peas.

CHARLES A. MICHELS.